United States Patent
Gruenwald

[11] Patent Number: 6,086,813
[45] Date of Patent: Jul. 11, 2000

[54] METHOD FOR MAKING SELF-SUPPORTING THERMOPLASTIC STRUCTURES

[75] Inventor: David J. Gruenwald, Butte des Morts, Wis.

[73] Assignee: Brunswick Corporation, Lake Forest, Ill.

[21] Appl. No.: 08/936,005

[22] Filed: Sep. 23, 1997

[51] Int. Cl.[7] .............................. B29C 35/08; B29C 41/08
[52] U.S. Cl. .......................... 264/460; 264/483; 264/517; 264/121; 264/309; 264/DIG. 72
[58] Field of Search .......................... 428/36.4; 117/357; 264/423, 424, 483, 131, 121, 123, 125, DIG. 72, 309, 460, 517; 425/DIG. 238

[56] References Cited

U.S. PATENT DOCUMENTS

| | | | |
|---|---|---|---|
| 1,971,804 | 8/1934 | Alexander | 91/70.1 |
| 1,997,874 | 4/1935 | Power | 264/309 |
| 2,101,922 | 12/1937 | Stoesling | 91/45 |
| 2,120,406 | 6/1938 | Hansen | 264/DIG. 72 |
| 2,123,604 | 7/1938 | Johnson | 264/DIG. 72 |
| 2,165,099 | 7/1939 | Hansen | 264/309 |
| 2,355,225 | 8/1944 | MacWilliam | 117/104 |
| 2,466,906 | 4/1949 | Miller | 264/483 |
| 2,837,772 | 6/1958 | Deakin | 264/131 |
| 2,929,436 | 3/1960 | Hampshire | 264/121 |
| 2,968,083 | 1/1961 | Lentz et al. | 264/121 |
| 2,981,308 | 4/1961 | Thompson | 264/DIG. 72 |
| 3,075,066 | 1/1963 | Yenni et al. | 219/76 |
| 3,162,704 | 12/1964 | Attanasio et al. | 264/121 |
| 3,165,570 | 1/1965 | Deutsch | 264/121 |
| 3,210,230 | 10/1965 | Tyhurst | 264/309 |
| 3,338,999 | 8/1967 | Knapp | 264/121 |
| 3,440,086 | 4/1969 | Kerns | 264/DIG. 72 |
| 3,591,759 | 7/1971 | Stand | 219/76 |
| 3,606,481 | 9/1971 | Stand et al. | 302/50 |
| 3,607,998 | 9/1971 | Goodridge | 264/121 |
| 3,622,656 | 11/1971 | Dewey et al. | 264/309 |
| 3,677,471 | 7/1972 | Deakin | 239/85 |
| 3,715,076 | 2/1973 | Kenderi | 239/8 |
| 3,824,052 | 7/1974 | Fowler | 264/483 |
| 3,853,580 | 12/1974 | Gourdine | 264/483 |
| 3,958,758 | 5/1976 | Piorkowski | 239/133 |
| 4,057,450 | 11/1977 | Lee | 264/309 |
| 4,073,049 | 2/1978 | Lint | 264/309 |
| 4,073,839 | 2/1978 | Burkholder et al. | 264/309 |
| 4,142,265 | 3/1979 | Pfleger | 114/357 |
| 4,191,726 | 3/1980 | Stillhard et al. | 264/121 |
| 4,192,690 | 3/1980 | Meyer et al. | 264/DIG. 72 |
| 4,289,807 | 9/1981 | Christensen et al. | 264/121 |
| 4,552,715 | 11/1985 | Ando et al. | 264/309 |
| 4,681,712 | 7/1987 | Sakakibara et al. | 264/131 |
| 4,687,531 | 8/1987 | Potoczky | 264/309 |
| 4,822,549 | 4/1989 | Verwilst et al. | 264/309 |
| 5,041,713 | 8/1991 | Weidman | 219/121.51 |
| 5,093,059 | 3/1992 | Nathoo et al. | 264/121 |

(List continued on next page.)

OTHER PUBLICATIONS

"Can Develop a Solution to Your Problems"—Applied Polymer System, Inc.

*Primary Examiner*—Mary Lynn Theisen
*Attorney, Agent, or Firm*—Andrus, Sceales, Starke & Sawall

[57] ABSTRACT

A technique for forming self-supporting structures with thermoplastic material incorporates a plasma-heated spray of thermoplastic material with glass fiber reinforcement, such as glass fibers. The material is sprayed into a mold which is shaped to create the desired form and configuration of the self-supporting structure. A mixture of thermoplastic powder and reinforcing fibers is carried by a stream of inert gas through a plasma region. The thermoplastic material is melted as it passes through the plasma region and the resulting plasma is sprayed against the surface of a form mold. The thickness of the resulting structure can be varied from region to region by changing the speed of movement of a spray nozzle relative to the form, using a plurality of spray nozzles that can be selectively activated and deactivated, or by providing a plurality of coats of sprayed thermoplastic material, one after another.

8 Claims, 2 Drawing Sheets

U.S. PATENT DOCUMENTS

| | | | |
|---|---|---|---|
| 5,106,910 | 4/1992 | Weidman et al. | 525/178 |
| 5,213,817 | 5/1993 | Pelley | 264/131 |
| 5,328,494 | 7/1994 | Kelman et al. | 264/121 |
| 5,336,455 | 8/1994 | Kelman | 264/121 |
| 5,370,831 | 12/1994 | Blair et al. | 264/309 |
| 5,413,750 | 5/1995 | Kelman et al. | 264/121 |
| 5,618,589 | 4/1997 | McFarland | 264/131 |
| 5,718,863 | 2/1998 | McHugh et al. | 264/309 |
| 5,843,365 | 12/1998 | Pinson et al. | 264/121 |
| 5,882,372 | 3/1999 | Brown et al. | 264/121 |

METHOD FOR MAKING SELF-SUPPORTING THERMOPLASTIC STRUCTURES

BACKGROUND OF THE INVENTION

1. Field of the Invention

The present invention is generally related to the manufacture of self-supporting structures made of thermoplastic material and, more particularly, to a process by which thermoplastic material can be sprayed into a mold structure to form varying thicknesses at preselected locations of the structure to provide self-supporting structural integrity for the completed component.

2. Description of the Prior Art

At the present time, numerous self-supporting structures, such as boat hulls and the like, are made by spraying a thermoset material into a mold which is shaped to form a desired configuration of the finished product. Generally, two liquids are mixed together in known processes and an exothermic reaction occurs. For example, a liquid resin and a liquid hardener can be mixed and sprayed into the mold. In certain applications, glass strands are added to the mixture prior to the spraying process. The glass strands reinforce the structure and provide the necessary strength for the structure to be self-supporting and have the durability necessary for certain applications, such as in the manufacture of boat hulls.

The known methods of manufacturing self-supporting structures have certain serious disadvantages. First, the cure cycle for many thermoset materials can require as much as twelve hours. In addition, the resin has a solvent within it to lower its viscosity. This solvent typically contains styrenes which have been determined to be harmful to the environment. It is likely that the use of styrenes will be strictly controlled in the future because of these environmental considerations.

As discussed above, the cure cycle of a self-supporting structure can often take as many as twelve hours to complete. If the thermoset material is sprayed in consecutive layers, which is a typical way to manufacture a boat hull by this known process, each layer can require up to forty minutes curing time. In addition, each layer must generally be cured before the application of subsequent layers.

A serious disadvantage of using thermoset material is that the cured material is not suitable for recycling. In other words, the thermoset material, such as polyester resin, can not be melted when the structure is salvaged to permit its use in another product.

It would therefore be significantly advantageous to the manufacture of structural devices, such as boat hulls, if a process could be developed which uses a thermoplastic material instead of a thermoset material. It would also be beneficial if the process could avoid the use of styrenes and other environmentally harmful elements. Additionally, it would be beneficial if the process could use a material which has a reduced cure time, as compared to the thermoset process, and which permits recycling of the formed structures after their useful life is complete.

Thermoplastic material has been used as a protective coating for various components. As a example, Applied Polymer Systems, Inc. performs coating with a process that sprays a polymer coating on the object to be protected. The coating can be used for acid resistance or heat resistance and can comprise polyvinylidenefluoride (PVDF), linear polyethylene (LPE), polypropylene (PP), polypetrafluoroethylene copolymers (PTFE), flexible nylon, copolyamide nylon, polyesters, or any other suitable material. A document titled "Can Develop a Solution to Your Coating Problems" by Applied Polymer Systems, Inc. describes the basic technology used in the process and discusses several applications for the coating process.

U.S. Pat. No. 5,106,910, which issued to Weidman et al on Apr. 21, 1992, discloses a high concentration acid resistant coating. The improved polyamide-based compositions described in this patent are particularly formulated for plasma-spray application to surfaces that are subjected to acidic conditions. The compositions include respective amounts of polyvinylidene fluoride, a polyamide (e.g. N11) and a compatible adhesive such as a nylon perpolymer adhesive.

SUMMARY OF THE INVENTION

A process for manufacturing a self-supporting thermoplastic structure in accordance with the present invention comprises the steps of providing a form defining a shape for the structure. The form can be a shell-like shaped structure that acts like a mold when the thermoplastic material is deposited on the walls of the form. The self-supporting structure can be any type of component, such as a boat hull, which is required to maintain its own shape during manufacture and use.

The process of the present invention further comprises the step of providing a thermoplastic material in a granulated form. A granulated form can be as fine as powder and the size of the particles of thermoplastic material will depend on the equipment used to produce the self-supporting structure and the specific thermoplastic material used in the process.

The present invention further comprises the step of creating a stream of gas flowing through a first conduit. The gas can be argon, but other gases can be used. The present invention further comprises a step of injecting the thermoplastic material into the stream of gas so that it moves along with the stream of gas. An additional step of the present invention is heating the thermoplastic material as it moves with the stream of gas and directing a spray of the heated thermoplastic material against a surface of the form. Additionally, the present invention allows the thermoplastic material to cure while in contact with the surface of the form. After the thermoplastic material in the form is completely cured, it can be removed from the form.

Various embodiments of the present invention can further comprise the step of providing a plurality of glass fibers and injecting the plurality of glass fibers into the stream of gas before the heating step is performed.

The self-supporting structure made in accordance with the present invention can be the hull of a watercraft. The structure can comprise regions of differing thicknesses created by sequentially directing a plurality of sprays of the thermoplastic at a preselected region of the form. The different thicknesses of thermoplastic material contained within the self-supporting structure can be provided either by repeated spraying of thermoplastic material at one general area of the form or, alternatively, by slowing the movement of spray nozzles as they move past the vicinity where it is desired to have a thicker portion of the structure.

In one embodiment of the present invention, a plurality of spray nozzles are used to direct a spray toward a region of the form. To vary the thickness of thermoplastic material sprayed on a particular region of the form, various ones of the plurality of nozzles can be activated or deactivated as the nozzles are moved past various areas of the form.

The process of the present invention can further comprise the step of adding glass fibers into the thermoplastic material.

BRIEF DESCRIPTION OF THE DRAWINGS

The present invention will be more fully and completely understood from a reading of the description of the preferred embodiment in conjunction with the drawings, in which.

DESCRIPTION OF THE PREFERRED EMBODIMENT

Figure 1:
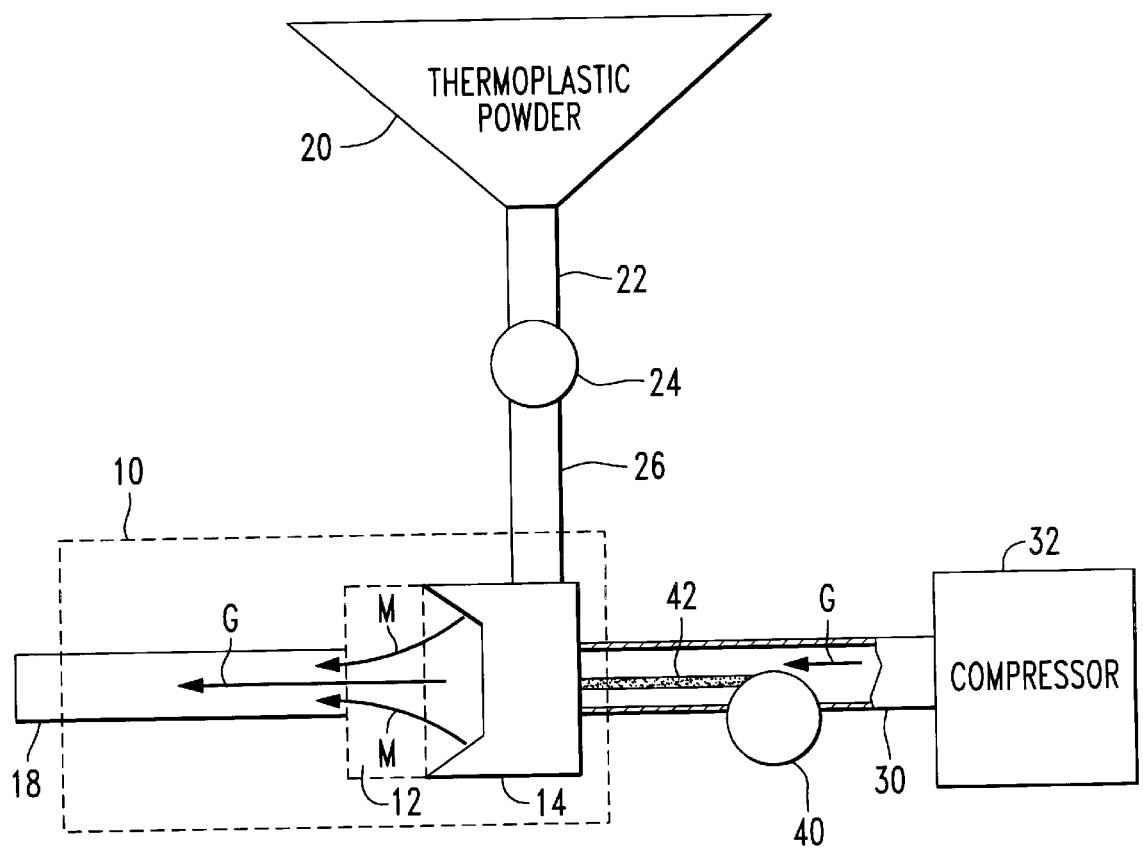
FIG. 1 shows a known method for producing a plasma for thermoplastic material.

Throughout the description of the preferred embodiment of the present invention, like components will be identified by like reference numerals.

Dashed box 10 represents a housing in which a blending head 14, a plasma region 12 and a nozzle 18 are contained. A hopper 20 is provided with a supply of thermoplastic powder. The powder can be various magnitudes in particulate size, depending on the particular equipment used and the specific application of the device. The thermoplastic powder is fed from the hopper 20, through a first conduit 22, to a blower 24. The powder is then blown through a second conduit 26 into the blending head 14. Throughout this description, the terms "powder" shall refer to particulates of any size.

A stream of gas is caused to flow through a third conduit 30 by a compressor 32. The direction of gas flow is represented by arrow G.

A reel 40 of glass fiber 42 allows the glass fiber to be introduced into the gas stream G and into the blending head 14 and chopper. Although not shown in detail in FIG. 1, a means is provided for chopping the glass fiber 42 into shorter lengths so that they can be entrained within the gas stream G. These glass fibers, after being chopped into short lengths, are mixed with the thermoplastic powder casting into the blending head 14 through the second conduit 26. The mixture of thermoplastic powder and glass fibers is blended into a generally homogenous composition and ejected into the gas stream G through openings in the blending head 14. This generally homogeneous composition enters the gas stream in the directions represented by arrows M. As the composition of thermoplastic powder and glass fibers passes through the plasma region 12, the intense heat melts them. To those skilled in the art, the term "plasma" is sometimes considered a fourth state of matter, in addition to solid, liquid, and gas. The extremely hot substance consists of free electrons and positive ions. Although it is electrically conductive, it is also electrically neutral. A system of the type shown in FIG. 1 utilizes an inert gas that passes through the electric arc between an anode and cathode which form the plasma zone, or region 12. This gas, which is typically argon, loses one its electrons and becomes a highly energetic and extremely hot plasma. As the plasma leaves the plasma zone 12, the thermoplastic powder and the gas stream G are introduced into the plasma stream in controlled amounts. As the material is caught in the high velocity hot plasma stream, it absorbs the high temperature of the plasma, becomes molten, and is projected through the nozzle 18 against a surface. When used in conjunction with the present invention, the molten thermoplastic material is projected against a surface of the form or previously sprayed layers. When individual particles impact against the surface of the form at high speeds, thermal and mechanical energies are transferred to the substrate of the form and produce forces which favor high level bonding and excellent adhesion.

Equipment generally similar to that represented schematically in FIG. 1 has been developed by companies such as Applied Polymer Systems, Inc. for use in coating materials to protect the materials from corrosion or oxidation. The material is applied in an extremely thin layer, similar to a layer of paint, to provide a protective skin that is not subject to corrosion in hostile environments.

The present invention proposes to use a device such as that illustrated in FIG. 1 for a unique purpose of producing a self-supporting structure made of thermoplastic material. Rather than using the technology to merely provide a protective coating on an object, the present invention uses this technology to construct a self-supporting structure which, when removed from a form mold, will have sufficient strength and durability to be used as a boat hull or other similar structure.

Figure 2:
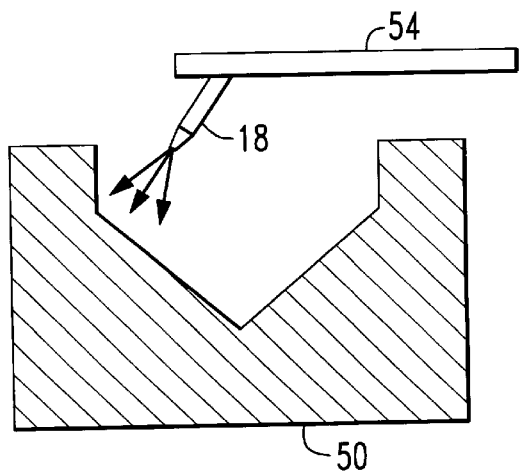
FIG. 2 shows a nozzle spraying thermoplastic material into a form mold.

FIG. 2 schematically shows a form 50 that is generally shaped to provide the configuration of a boat hull. It should be understood that the figures are highly schematic and are intended to illustrate the basic principles of the present invention. As such, they do not represent the precise shape and proportion of the form 50 or the resulting boat hull. Instead, they are intended to be illustrative in nature to show a hypothetical practice of the present invention. An arm 54 of a machine tool, such as a robotic machine, has a nozzle 18 attached to it. In FIG. 2, the associated equipment attached to the nozzle 18, as illustrated in FIG. 1, is not shown for purposes of simplicity and clarity. The arm 54 can be moved relative to the form 50 and the thermoplastic plasma is emitted from the nozzle 18 in the direction of a region of the form 50. This ejection is represented by the arrows emanating from the nozzle 18 in FIG. 2. As the boat hull is produced, the arm 54 would be automatically moved relative to the form 50 to spray the thermoplastic material and its entrained glass fibers against the surface of the form. When the thermoplastic plasma strikes the surface of the form, the ionized plasma is attracted to the form 50. The molten thermoplastic material, after being emitted from the nozzle 18, strikes the surface of the form and flows in conformance with the shape of the form. Immediately after impact, the molten thermoplastic material begins to cure, or solidify, and retains the shape of the form. It should be understood that the thickness of the layer of thermoplastic material clinging to the surface of the form will depend on several factors. First, the number of layers sprayed in any particular region will determine the thickness of that particular region. In addition, the rate of speed of movement of the nozzle 18, as it moves past a particular region, combined with the flow rate of plasma through the nozzle, will determine the thickness of the material in that region. Therefore, if a thicker dimension is required in certain regions of the structure, that increased thickness can be achieved in several ways. First, the spray nozzle 18 can be moved past the region repeatedly so that each subsequent coat of thermoplastic material is deposited on a preceding coat that has begun to cure sufficiently to support the subsequent coat. Another process to achieve the increased thickness is to move the nozzle more slowly as it passes the region that is intended to be thicker. A third technique is to provide a plurality of nozzles on the arm 54 and selectively activate and deactivate the nozzles to provide a thicker spray of thermoplastic plasma at the regions that are intended to be thicker.

Figure 3:
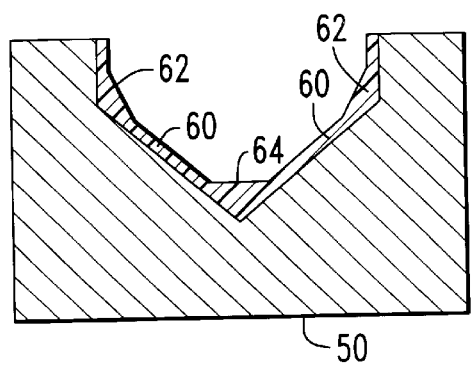
FIG. 3 shows the form mold of FIG. 2 after the spraying process is complete.

FIG. 3 shows the form 50 after the thermoplastic material has been deposited against the relevant surfaces of the form. For purposes of illustration, certain regions 60 are shown as having a certain thickness while other regions 62 are shown as having thicker regions. The bottom portion 64 of the boat hull is shown having the thickest dimension. These various thicknesses are accomplished by one or more of the above described three techniques.

Figure 4:
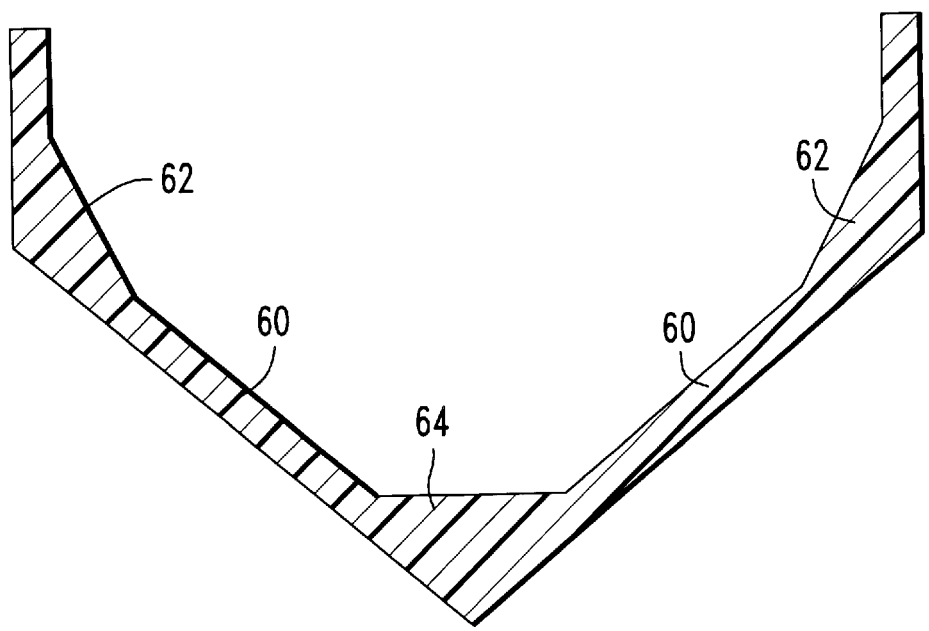
FIG. 4 shows the resulting self-supporting structure made by the process illustrated in FIGS. 2 and 3.

After the thermoplastic material is allowed to cool and solidify, the thermoplastic structure is removed from the form 50. FIG. 4 shows the resulting structure. It should be understood that the structure shown in FIG. 4 is intended to represent a cross sectional view taken through a boat hull. It is highly schematic and intended only to represent the basic capabilities of the present invention. The various thicknesses shown at regions 60, 62 and 64 result from the application of one of the above three techniques for creating thicker portions of the boat hull. If additional strength is required, it should be understood that stiffeners or support struts could be manually added to the structure and covered with subsequent spray coatings of the thermoplastic material.

Figure 5:
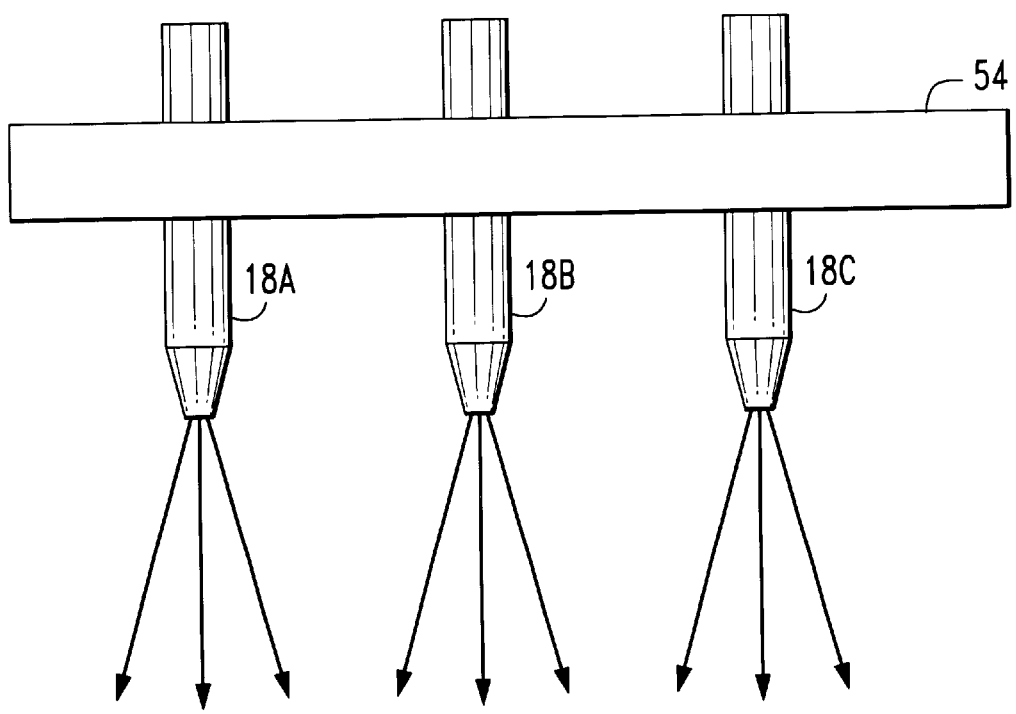
FIG. 5 shows an embodiment of the present invention which utilizes a plurality of nozzles attached to an arm of a robotic machine.

FIG. 5 illustrates the concept of providing a group of nozzles on the arm 54 which is controlled by a robotic machine. The nozzles 18A, 18B and 18C can be selectively activated and deactivated to vary the thickness of the thermoplastic material sprayed into the form 50 at any particular location. For example, when a thin walled region is desired, a single nozzle 18B can be activated as the arm passes that region. When a slightly thicker wall structure is required, two nozzles, 18A and 18C can be activated. In addition, the thickest regions of the structure can be accomplished by activating all three nozzles simultaneously. As described above, these variations in thickness can also be accomplished by slowing the speed of the arm 54 as it passes over the surfaces of the form or, alternatively, by applying successive coats of the thermoplastic material after previous coats have begun to cure.

The advantages of the present invention are numerous. First, a self supporting structure made in accordance with the present invention uses a thermoplastic material which, in turn, requires no styrenes as are required in the known system of boat hull manufacturing which uses thermoset material. In other words, no resin and hardener are required by the present invention. Furthermore, the curing time of the thermoplastic material is almost instantaneous when the thermoplastic plasma strikes the surface of the form. Rather than taking up to forty minutes per layer, subsequent coats of the thermoplastic material can be sprayed over preceding coats almost immediately.

One of the most important advantages of the present invention is that it uses thermoplastic material which is recyclable. In other words, when a boat made by the present invention is scrapped, the hull can be chopped into small pieces and remelted for an alternative use. This is impossible if thermoset materials are used. After curing, thermoset materials burn rather than melt. Thermoplastic materials can be remelted and reformed to be used again. One of the most significant advantages of the present invention is that it does not require the use of chemicals that are potentially harmful to the environment. The use and storage of the resins and hardeners required for a thermoset procedure are both expensive and potentially harmful to the environment. As a result, the use of these styrene materials may be severely regulated and restricted in the future. The present invention does not use these materials and is therefore much less likely to create harmful conditions, both for humans and the environment. The present invention also creates a safer work place environment for the operator who manufactures the boat hull or other component.

A potential disadvantage of the present invention is the formulation of small air bubbles in the thermoplastic material. In addition, the outer surface of the structural member, which was initially formed against the surface of the form 50, may not appear to have the degree of gloss that is available by other methods. However, notwithstanding these characteristics, the present invention provides a significant improvement over the use of thermoset materials in both cost, environmental safety and the ability to recycle after initial use.

Although the present invention has been described in particular detail to show a preferred embodiment of the present invention, it should be understood that alternative embodiments are also within its scope.

What is claimed is:

1. A method for making self supporting thermoplastic structure, comprising:

providing a form defining a shape for said structure;

providing a thermoplastic material in a granulated form;

creating a stream of gas flowing through a first conduit, said stream creating step being accomplished by a compressor;

injecting said thermoplastic material into said stream of gas;

heating said thermoplastic material as it moves with said stream of gas, said heating step comprising passing said thermoplastic material and said stream of gas through a plasma zone;

directing a spray of said thermoplastic material, after said heating step, against a surface of said form, said directing step comprises the step of directing said spray of said thermoplastic material through at least one nozzle;

allowing said thermoplastic material to cure while in contact with said surface of said form;

removing said self supporting structure from said form;

providing a plurality of reinforcing fibers; and injecting said plurality of reinforcing fibers into said stream of gas before said heating step.

2. The method of claim 1, wherein:

said gas is argon.

3. The method of claim 1, wherein:

said structure is a hull of a watercraft; and said structure comprises regions of differing thickness created by sequentially directing a plurality of said sprays of said thermoplastic material at a preselected region of said form.

4. The method of claim 1, further comprising:

pressing exposed ones of said plurality of glass fibers into said thermoplastic material after said spray thermoplastic material is directed against said surface of said form.

5. A method for making self supporting thermoplastic structure, comprising:

providing a form defining a shape for said structure;

providing a thermoplastic material in a granulated form;

creating a stream of gas flowing through a first conduit, said stream creating step being accomplished by a compressor;

injecting said thermoplastic material into said stream of gas;

heating said thermoplastic material as it moves with said stream of gas, said heating step comprising passing said thermoplastic material and said stream of gas through a plasma zone;

directing a spray of said thermoplastic material, after said heating step, against a surface of said form, said directing step comprises the step of directing said spray of said thermoplastic material through at least one nozzle;

allowing said thermoplastic material to cure while in contact with said surface of said form;

removing said self supporting structure from said form;

providing a plurality of reinforcing fibers; and injecting said plurality of reinforcing fibers into said stream of gas before said heating step, said structure being a hull of a watercraft, said structure comprising regions of differing. thickness created by sequentially directing a plurality of said sprays of said thermoplastic material at a preselected region of said form.

6. The method of claim 5, wherein:

said gas is argon.

7. The method of claim 6, further comprising:

pressing exposed ones of said plurality of glass fibers into said thermoplastic material after said spray thermoplastic material is directed against said surface of said form.

8. A method for making self supporting thermoplastic structure, comprising:

providing a form defining a shape for said structure;

providing a thermoplastic material in a granulated form;

creating a stream of argon gas flowing through a first conduit, said stream creating step being accomplished by a compressor;

injecting said thermoplastic material into said stream of argon gas;

heating said thermoplastic material as it moves with said stream of argon gas, said heating step comprising passing said thermoplastic material and said stream of argon gas through a plasma zone;

directing a spray of said thermoplastic material, after said heating step, against a surface of said form, said directing step comprises the step of directing said spray of said thermoplastic material through at least one nozzle;

allowing said thermoplastic material to cure while in contact with said surface of said form;

removing said self supporting structure from said form;

providing a plurality of reinforcing fibers;

injecting said plurality of reinforcing fibers into said stream of argon gas before said heating step, said structure being a hull of a watercraft, said structure comprising regions of differing thickness created by sequentially directing a plurality of said sprays of said thermoplastic material at a preselected region of said form; and pressing exposed ones of said plurality of glass fibers into said thermoplastic material after said spray thermoplastic material is directed against said surface of said form.

* * * * *